United States Patent
Lee et al.

(10) Patent No.: US 9,131,354 B2
(45) Date of Patent: Sep. 8, 2015

(54) METHOD FOR UPDATING TERMINAL GROUP IDENTIFIER IN MACHINE-TO-MACHINE COMMUNICATION

(75) Inventors: Eunjong Lee, Anyang-Si (KR); Jeongki Kim, Anyang-Si (KR); Jinsam Kwak, Anyang-Si (KR); Youngsoo Yuk, Anyang-si (KR); Giwon Park, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 14/342,707

(22) PCT Filed: Mar. 30, 2012

(86) PCT No.: PCT/KR2012/002409
§ 371 (c)(1),
(2), (4) Date: Mar. 4, 2014

(87) PCT Pub. No.: WO2013/035954
PCT Pub. Date: Mar. 14, 2013

(65) Prior Publication Data
US 2014/0221036 A1    Aug. 7, 2014

Related U.S. Application Data

(60) Provisional application No. 61/532,570, filed on Sep. 9, 2011, provisional application No. 61/536,540, filed on Sep. 19, 2011, provisional application No. 61/544,281, filed on Oct. 7, 2011, provisional application No. 61/549,239, filed on Oct. 20, 2011.

(51) Int. Cl.
| | |
|---|---|
| *H04B 7/00* | (2006.01) |
| *H04W 4/08* | (2009.01) |
| *H04W 4/00* | (2009.01) |
| *H04W 4/02* | (2009.01) |
| *H04W 72/12* | (2009.01) |
| *H04W 4/06* | (2009.01) |

(52) U.S. Cl.
CPC ............ *H04W 4/08* (2013.01); *H04W 4/005* (2013.01); *H04W 4/021* (2013.01); *H04W 4/06* (2013.01); *H04W 72/121* (2013.01)

(58) Field of Classification Search
USPC ................. 455/517–520, 553.1, 90.2, 426.1, 455/414.1, 524, 444
See application file for complete search history.

(56) References Cited

U.S. PATENT DOCUMENTS

| | | | | |
|---|---|---|---|---|
| 2011/0201365 | A1* | 8/2011 | Segura ......................... | 455/466 |
| 2012/0196608 | A1* | 8/2012 | Ting et al. .................... | 455/450 |
| 2012/0231828 | A1* | 9/2012 | Wang et al. .................. | 455/509 |

OTHER PUBLICATIONS

Namgi Kim, et al., "Proposed text of MGID reassignment procedure in idle state for IEEE 802.16p system", IEEE 802.16 Broadband Wireless Access Working Group, IEEE C802.16p-11/0144r3, Jul. 9, 2011.

(Continued)

*Primary Examiner* — Dominic E Rego
(74) *Attorney, Agent, or Firm* — Dentons US LLP

(57) ABSTRACT

Disclosed is a method for a terminal, which is in an idle state in a wireless access system that supports machine-to-machine (M2M) communication, updating an M2M group identifier (MGID), which identifies a multicast service flow that is shared by a group of M2M terminals inside an M2M group zone. The method can comprises the steps of: receiving from a first base station the MGID and the M2M group zone identifier of the first base station; receiving from a second base station an M2M group zone identifier of the second base station; requesting from the second base station an MGID update when the M2M group zone identifier of the second base station is different from the M2M group zone identifier of the first base station; and updating the MGID on the basis of a new MGID that is transmitted from the second base station as a response to the request.

20 Claims, 3 Drawing Sheets

(56) References Cited

OTHER PUBLICATIONS

Giwon Park, et al., "Reply contribution on C80216p-1110002 (Location update)", IEEE 802.16 Broadband Wireless Access Working Group, IEEE C802.16p-11/0036, Mar. 13, 2011.

Rui Huang, et al., "M2M Group ID Assignment Scheme in IEEE802.16m System", IEEE 802.16 Broadband Wireless Access Working Group, IEEE C802.16p-11/0154r1, Jul. 8, 2011.

Jinsoo Choi, et al., "Consideration on the Update Procedure of the System Information for M2M", IEEE 802.16 Broadband Wireless Access Working Group, IEEE 0802.16p-10/0023r1, Jan. 7, 2010.

* cited by examiner

METHOD FOR UPDATING TERMINAL GROUP IDENTIFIER IN MACHINE-TO-MACHINE COMMUNICATION

This application is a 35 USC §371 National Stage entry of International Application No. PCT/KR2012/002409, filed Mar. 30, 2012, and claims priority to U.S. Provisional Application Nos. 61/532,570, filed Sep. 9, 2011, 61/536,540, filed Sep. 19, 2011, 61/544,281, filed Oct. 7, 2011, and 61/549,239, filed Oct. 20, 2011, all of which are hereby incorporated by reference in its entirety.

TECHNICAL FIELD

The present invention relates to a method for an M2M terminal to manage an M2M group identifier and, more particularly, to a method for an M2M terminal to update an M2M group identifier on the basis of an M2M group zone identifier.

BACKGROUND ART

Machine-to-Machine (M2M) Communication (Machine Type Communication: MTC)

A brief description will be given of M2M communication (or MTC).

M2M communication refers to communication between electronic devices, that is, between machines. While M2M communication means wired or wireless communication between electronic devices or between a human controlled device and a machine in general, it is used to refer to wireless communication between electronic devices, that is, between machines. M2M terminals used in a cellular network have poorer performance or capabilities than general terminals.

Many terminals are present in a cell and may be classified according to type, class, service type, etc.

For example, terminals can be classified into a terminal for human type communication (HTC) and a terminal for machine type communication (MTC). MTC may include communication between M2M terminals. HTC refers to signal transmission and reception according to determination of signal transmission by human, whereas MTC refers to signal transmission by terminals according to generation of event or periodically without human intervention.

When M2M communication (or MTC) is considered, the number of terminals may abruptly increase. M2M terminals may have the following features based on services supported thereby.

1. A large number of terminals in a cell
2. A small quantity of data
3. Low transmission frequency (M2M terminal may have transmission periodicity)
4. A limited number of data characteristics
5. Insensitive to time delay
6. Low mobility or fixed M2M communication may be used in various fields such as protected access and monitoring, trace and discovery, public safety (emergency, disaster, etc.), payment (vending machines, ticket machines, parking meters, etc.), health care, remote control, smartmeter, etc.

Idle Mode

An idle mode is a mechanism in which a terminal can periodically receive a downlink broadcast message without registering in a specific base station even when the terminal moves in a wireless link environment in which a plurality of base stations is located throughout a wide area.

The idle mode is a state in which only downlink synchronization has been achieved such that all normal operations including handover (HO) are stopped and a paging message corresponding to a broadcast message can be received only in a specific period. The paging message instructs a terminal to perform a paging action. For example, the paging action includes ranging, network reentry, etc.

The idle mode may be initiated by a terminal or a base station. That is, the terminal can enter the idle mode by transmitting a deregistration request DREG-REQ message to the base station and receiving a deregistration response DREG-RSP message from the base station as a response to the deregistration request message. Otherwise, the base station can enter the idle mode by transmitting an unsolicitated deregistration response message DREG-RSP or a deregistration command DREG-CMD message to the terminal.

When the terminal receives a paging message directed thereto within an available interval (AI) in the idle mode, the terminal changes to a connected mode through a network reentry process with the base station to transmit/receive data.

DISCLOSURE

Technical Problem

A method for a terminal or a base station to recognize change of an M2M group zone, which may occur due to terminal mobility, has not been clearly defined. Accordingly, an object of the present invention is to provide a method for recognizing change of an M2M group zone by a terminal or a base station and a method for effectively updating an MGID of a terminal.

Technical Solution

The object of the present invention can be achieved by providing a method by which a terminal in an idle state in a wireless access system supporting machine-to-machine (M2M) communication updates an M2M group identifier (MGID) for identifying a multicast service flow shared by a group of M2M terminals in an M2M group zone. The method includes: receiving, from a first base station, the MGID and an M2M group zone identifier of the first base station; receiving, from a second base station, an M2M group zone identifier of the second base station; requesting MGID update to the second base station when the M2M group zone identifier of the second base station is different from the M2M group zone identifier of the first base station; and the second base station updating the MGID on the basis of a new MGID transmitted from the second base station as a response to the request.

The receiving of the M2M group zone identifier of the second base station from the second base station may include receiving the M2M group zone identifier of the second base station through a broadcast message.

The broadcast message may be AAI-SCD (system configuration descriptor) message or DCD (DL channel descriptor) message.

The requesting of MGID update to the second base station may include triggering location update and requesting MGID update through location update.

The requesting of MGID update through location update may include transmitting a parameter related to MGID update. The parameter related to MGID update may include the current MGID and current M2M group zone ID.

The transmitting of the parameter related to MGID update may include transmitting the parameter related to MGID update through RNG-REQ (ranging request) message.

The new MGID transmitted from the second base station may be transmitted through AAI-RNG-RSP (ranging response) message.

The requesting of MGID update to the second base station may be performed through a network reentry procedure.

The receiving of the MGID and the M2M group zone identifier of the first base station from the first base station may include receiving the MGID and the M2M group zone identifier of the first base station through a dynamic service addition (DSA) procedure.

In another aspect of the present invention, provided herein is a terminal supporting M2M communication. The terminal includes a transceiver for transmitting/receiving an RF signal to/from an external device and a controller connected to the transceiver.

The controller may control the transceiver to receive, from a first base station, an MGID and an M2M group zone identifier of the first base station, to receive, from a second base station, an M2M group zone identifier of the second base station and to request MGID update to the second base station when the M2M group zone identifier of the second base station is different from the M2M group zone identifier of the first base station and update the MGID on the basis of a new MGID transmitted from the second base station as a response to the request.

The controller may control the transceiver to receive the M2M group zone identifier of the second base station through a broadcast message.

The broadcast message may be AAI-SCD message or DCD message.

The controller may trigger location update to request MGID update to the second base station and control the transceiver to request MGID update through location update.

The controller may control the transceiver to transmit a parameter related to MGID update to the second base station through location update.

The parameter related to MGID update may include the current MGID and current M2M group zone ID.

The controller may control the transceiver to transmit the parameter related to MGID update through RNG-REQ message.

The new MGID transmitted from the second base station may be transmitted through AAI-RNG-RSP message.

The controller may control the transceiver to request MGID update to the second base station through a network reentry procedure.

The controller may control the transceiver to receive the MGID and the M2M group zone identifier of the first base station through a DSA procedure.

Advantageous Effects

According to embodiments of the present invention, an M2M terminal of a broadband wireless communication system can recognize change of an M2M group zone and efficiently update an MGID based on the changed M2M group zone.

BEST MODE

Figure 1:
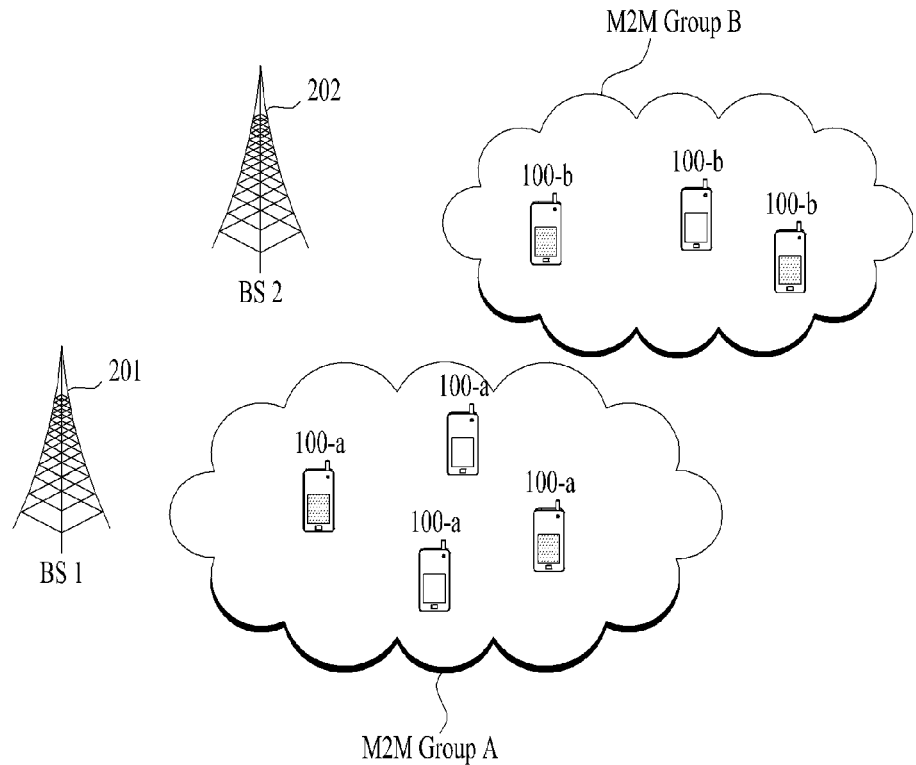
FIG. 1 illustrates a wireless access network to which an embodiment of the present invention is applicable.

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolved from 3GPP LTE.

TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). IEEE 802.16m evolved from IEEE 802.16e and provides backward compatibility with systems based on IEEE 802.16e. 802.16p provides a communication protocol supporting MTC.

The terminology used in the description of the invention herein is for the purpose of describing particular embodiments only and is not intended to be limiting of the invention. Unless otherwise defined, all terms used in embodiments of the invention, including technical and scientific terms, have the same meaning as commonly understood by one of ordinary skill in the art to which the present invention pertains, and are not necessarily limited to the specific definitions known at the time of disclosure. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the singular forms are intended to include the plural forms as well, unless context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, etc. may be used herein to describe various elements, these elements should not be limited by these terms. These terms are only used to distinguish one element from another element. For example, a first element may be termed second element and similarly, a second element may be termed first element without departing from the teachings of the present invention.

It will be further understood that, when a component is "connected" or "coupled" to another component, a third component may be present between the two components while the component may be directly connected or coupled to the other component. However, when a component is "directly connected" or "directly coupled" to another component, it should be understood that a third component is not present between the two components.

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may obscure the subject matter of the present invention. The accompanying drawings illustrate exemplary embodiments of the present invention and provide a more detailed description of the present invention. However, the scope of the present invention should not be limited thereto. That is, the present invention may be embodied in many alternate forms and should not be construed as limited to the embodiments set forth herein. Accordingly, while the invention may be modified in various ways and take alternative forms, specific embodiments thereof are shown by way of example in the drawings and will herein be described in detail. It should be understood, however, that there is no intent to limit the invention to the particular forms disclosed and the invention is to cover all modifications, equivalents, and alternatives falling within the spirit and scope of the invention as defined by the claims.

While embodiments of the present invention will be described on the basis of IEEE 802.16 for clarity, the technical spirit of the present invention is not limited thereto.

FIG. 1 illustrates a wireless access network to which an embodiment of the present invention is applicable.

Referring to FIG. 1, the wireless access network may include a terminal 100 and base stations 201 and 202. The terminal 100 may be fixed or mobile. The terminal may be referred to by different terms such as user equipment (UE), user terminal (UT), subscriber station (SS), wireless device, advanced mobile station (AMS), etc. The terminal 100 includes an MTC or M2M terminal.

The base stations 201 and 202 refer to fixed stations communicating with the terminal 100. The base station may be referred to by different terms such as node B, base transceiver system (BTS), access point (AP), etc. One base station 201 or 202 may include one or more cells.

While embodiments of the present invention will be described based on IEEE 802.16 for clarity, the technical spirit of the present invention is not limited thereto.

An M2M terminal according to an embodiment of the present invention may belong to one or more M2M groups. The M2M group is a group of M2M terminals that share one or more features. For example, the M2M group can be a set of terminals provided with a specific application service. Each M2M group is allocated an M2M group identifier (MGID) which identifies a specific M2M group in a network entity. The network entity may be an M2M server, for example.

The MGID is assigned by the network entity. The MGID may be allocated to a service flow of the M2M terminal through a DSA procedure after initial network entry. Otherwise, the MGID may be allocated through a different procedure. The allocated MGID is maintained by the M2M terminal as long as the M2M terminal does not exit the network or the network does not delete the service flow corresponding to the MGID. The MGID may be changed through a dynamic service change (DSC) procedure.

An M2M group zone identifier (or network entity identifier) identifies the network entity that allocates the MGID. That is, an M2M group zone may be regarded as an area where a specific MGID is valid. One M2M group may include one or more base stations and one base station may belong to one or more M2M groups. The mapping relationship between a service flow and MGID is constant within one M2M group and may differ between M2M groups. A base station may transmit the ID of an M2M group zone to which the base station belongs to terminals through a broadcast message (e.g. AAI-SCD message).

Figure 2:
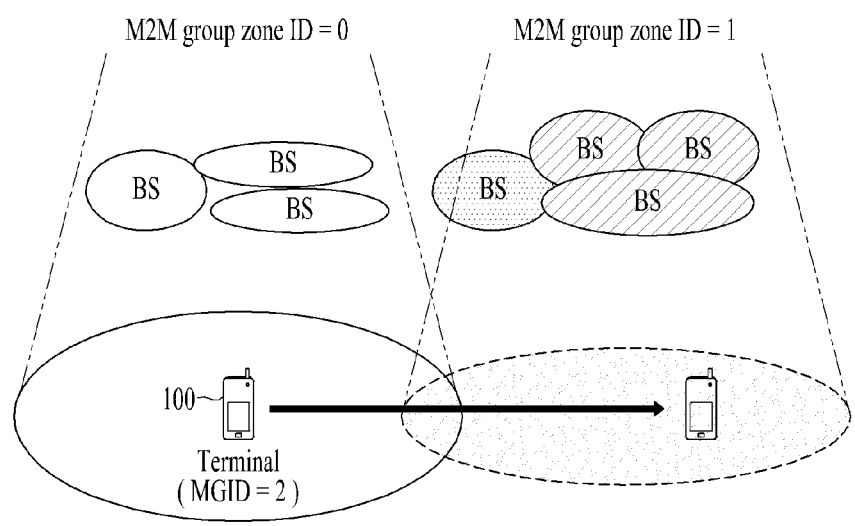
FIG. 2 illustrates a situation in which an M2M terminal needs to update an M2M group identifier (MGID).

FIG. 2 illustrates a situation in which an M2M terminal needs to update an MGID.

As described above with reference to FIG. 1, each base station may belong to a specific M2M group zone. Base stations illustrated in FIG. 2 belong to an M2M group zone with ID of 0 or an M2M group zone with ID of 1.

If an M2M terminal moves from the M2M group zone with ID of 0 to the M2M group zone with ID of 1, then an MGID supported by each M2M group zone may be changed.

If the MGID supported by an M2M group zone is changed, that is, an M2M terminal allocated the MGID exits the M2M group zone in which the MGID is valid and moves to a new M2M group zone, then the M2M terminal and network need to recognize the same and to update the MGID to the MGID corresponding to the new M2M group zone.

Although the MGID corresponding to a specific service flow (e.g. transportation information, traffic map information, etc.) is allocated to 2 in the M2M group zone with ID of 0, as illustrated in FIG. 2, the MGID corresponding to the same service flow may be allocated to 3 in the M2M group zone with ID of 1. In this case, the M2M terminal needs to update the MGID to correctly receive data.

IEEE 802.16p does not define a method through which a terminal or base station recognizes change of an M2M group zone, which may occur due to terminal mobility. In addition, a procedure for updating an MGID according to change of an M2M group zone is not defined.

Accordingly, if a terminal or a base station recognizes change of an M2M group zone and uses a conventional procedure for updating the corresponding MGID, then the terminal will perform the following operation.

(1) When the terminal is a connected mode terminal, the terminal performs a handover procedure when moving between base stations, and thus the terminal may update the MGID during handover or network reentry following handover. Otherwise, the terminal may update the MGID through a dynamic service change (DSC) procedure.

(2) An idle mode terminal needs to update the MGID upon exiting the previous M2M group zone since the idle mode terminal receives a group paging message using the MGID. Here, a location update procedure (group location update through a paging message, timer based update, etc.) or a network reentry procedure may be used. However, the location of the idle mode terminal is updated based on a paging group in a conventional technology, a method for recognizing change of an M2M group zone needs to be defined.

As described above, a method for recognizing changed of an M2M group zone and a procedure of updating an MGID have not been defined for the above-described two cases.

To solve this problem of the conventional technology, an embodiment of the present invention proposes a method through which a terminal receives an M2M group zone ID of a base station, which is transmitted through a broadcast message (or unicast message), determines whether a pre-allocated MGID is supported and updates the MGID through location update when MGID update is needed. That is, the present invention proposes a method for transmitting an updated MGID through a response message of the base station when the terminal transmits a message RNG-REQ for location update. Another embodiment of the present invention proposes a method for updating an MGID even during a network reentry procedure.

Figure 3:
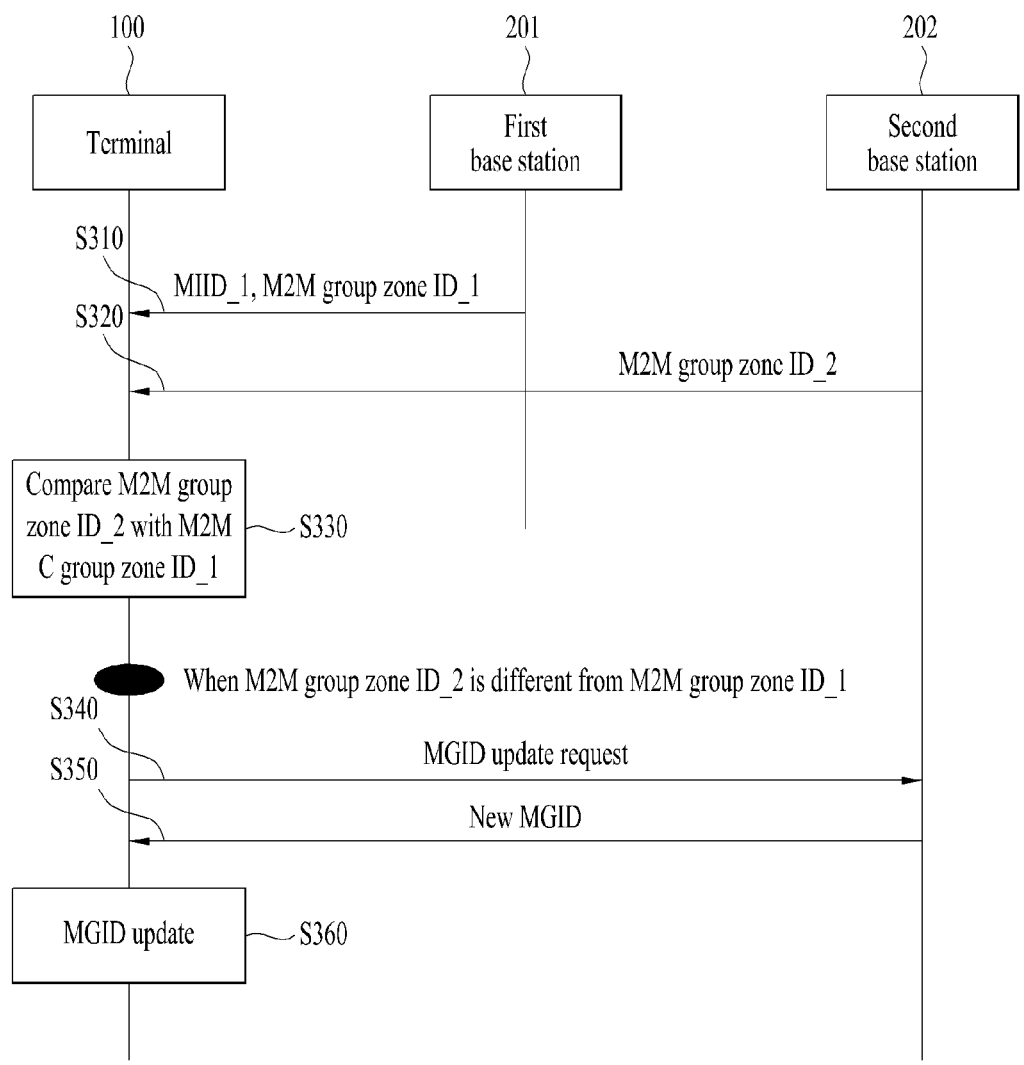
FIG. 3 is a flowchart illustrating an MGID update procedure according to an embodiment of the present invention.

FIG. 3 is a flowchart illustrating an MGID update procedure according to an embodiment of the present invention.

In the present embodiment, it is assumed that a first base station belongs to an M2M group zone with ID of 1 and a second base station belongs to an M2M group zone with ID of 2. In addition, it is assumed that, MGIDs corresponding to a specific service flow are different from each other in the two M2M group zones.

The terminal 100 receives, from the first base station 201, the MGID and an M2M group zone ID of the first base station (S310). Here, the terminal 100 may also receive information about mapping between the MGID and the M2M group zone ID. For example, the terminal can receive a pair of the MGID and the M2M group zone ID.

The terminal 100 may simultaneously receive the MGID and M2M group zone ID of the first base station through a specific procedure (e.g. DSA procedure) or respectively receive the same through separate procedures. For example, the terminal 100 can receive the M2M group zone ID of the first base station through a broadcast message such as AAI-SCD (system configuration descriptor), DCD (DL channel descriptor), NBR-ADV (neighbor advertisement), etc. Otherwise, the terminal 100 may receive the M2M group zone ID of the first base station through a superframe header (SFH) transmitted from the first base station.

The terminal 100 stores the received MGID and M2M group zone ID of the first base station.

Then, the terminal 100 exits the service area of the first base station 201 and enters the service area of the second base station 202 due to location movement in an idle mode state. Here, the terminal 100 receives M2M group zone ID of the second base station 202. The M2M group zone ID of the second base station 202 may be transmitted through a broadcast message such as AAI-SCD, DCD, NBR-ADV, etc. or an SFH.

When the M2M group zone ID of the second base station 202 is transmitted through the SFH, the terminal 100 may receive the SFH in a listening interval.

When the M2M group zone ID of the second base station 202 is transmitted through the message NBR-ADV, the terminal 100 may not recognize change of the M2M group zone ID since the terminal does not necessarily receive the message NBR-ADV when being in the idle mode. Accordingly, the base station preferably adds the M2M group zone ID to a broadcast message such as a paging information message and transmits the same for idle mode terminals.

The M2M group zone ID of the second base station 202 may be transmitted through a newly defined message (e.g. M2M information message). Here, the newly defined message may be configured as shown in Table 1.

TABLE 1

Num of M2M network entity ID
For(i=0; i<Num of M2M network entity ; i++){
    M2M Network entity ID
    Num of neighbor BSID
    For(j=0; j< num of BSID; j++){
    neighbor BSID }}

The above-described message may be periodically transmitted. Otherwise, when the terminal moves to the service area of a base station which does not correspond to the message, the terminal may request the base station to transmit the updated message.

Upon reception of the M2M group zone ID of the second base station 202 through the above-described method, the terminal 100 compares the M2M group zone ID M2M group zone ID_1 of the first base station with the M2M group zone ID M2M group zone ID_2 of the second base station (S330). When M2M group zone ID_2 is different from M2M group zone ID_1, the terminal 100 requests the second base station 2092 to update the MGID (S340). The second base station 202 transmits a new MGID at the request of the terminal 100 (S350) and the terminal updates the previous MGID on the basis of the new MGID received from the second base station 202 (S360). A description will be given of embodiments of an MGID update procedure and a new MGID transmission procedure.

First Embodiment of MGID Update Request and New MGID Transmission Procedure

The MGID update request process (S340) may be performed through location update. To achieve this, a location update trigger condition for M2M terminals may be added. That is, 'M2M group zone based location update' condition is added. In other words, the terminal performs location update when recognizing that the currently allocated MGID is no longer supported by other base stations and the corresponding base station reallocates a new MGID to the terminal during the location update procedure (or after the location update procedure).

In FIG. 3, the terminal 100 may perform location update for MGID update request in the second base station 202 that may not support the previously received MGID (from the first base station). For example, the terminal 100 can request MGID update by transmitting a message RNG-REQ to the second base station. Here, the message RNG-REQ may further include an MGID request indicator.

Upon reception of the message RNG-REQ in which the MGID update request indicator is set to 1 ('update request'), the second base station 202 may reallocate the MGID of the corresponding terminal through a message RNG-RSP. When service flow information of the terminal is needed for MGID reallocation, the second base station 202 may request the corresponding terminal to provide the service flow information or request the previous base station (first base station) or a paging controller to provide the service flow information. To achieve this, the terminal 100 may transmit the service flow information along with ID of the network entity domain that allocates the current MGID to the terminal, that is, the M2M group zone ID of the first base station, while requesting MGID update through RNG-REQ or DSCO-REQ.

Upon reception of the MGID of the terminal and/or the M2M group zone ID of the first base station through the location update procedure, the second base station may determine whether the MGID of the terminal needs to be updated or not (e.g. determine whether the M2M group zone ID of the first base station corresponds to the M2M group zone ID of the second base station) and reallocate the MGID of the terminal through AAI-RNG-RSP (or initiate an MGID update procedure) when the MGID of the terminal needs to be updated.

Second Embodiment of MGID Update Request and New MGID Transmission Procedure

The MGID update request process (S340) may be performed through network reentry. That is, the terminal requests MGID update by embedding the MGID update request indicator in a message transmitted in a network reentry procedure with respect to the corresponding base station and the base station includes a newly allocated MGID in the message transmitted in the network reentry and transmits the same. In this manner, the terminal can appropriately update the MGID.

Another Embodiment of MGID Update Procedure

The method for an idle mode terminal to update an MGID has been described. A description will be given of a method for a connected mode terminal to update an MGID.

It is assumed that the first base station belongs to the M2M group zone with ID of 1 and the second base station belongs to the M2M group zone with ID of 2. In addition, it is assumed that MGIDs corresponding to a specific service flow may be different from each other in the first and second base stations.

The connected mode terminal may recognize whether a previously allocated MGID is valid through a handover procedure and perform MGID update.

When the connected mode terminal moves to the service area of another base station, the connected mode terminal performs a handover procedure. The handover procedure may be performed through messages HO-REQ, HO-CMD and HO-IND. Here, HO-REQ and HO-IND may be omitted. When a serving base station instructs the terminal to hand over to a target base station through HO-CMD, the terminal hands over to the target base station and thus connection between the terminal and the target base station is established through network reentry. Network reentry includes transmission and reception of RNG-REQ and RNG-RSP messages.

The present invention proposes a method through which a connected mode terminal is newly allocated an MGID through the message HO-CMD or RNG-RSP. That is, the target base station includes the current MGID of the terminal and a newly allocated MGID in the message HO-CMD or RNG-RSP and transmits the same. When a new MGID is allocated through the message HO-CMD, the target base station preferably transmits the new MGID to the serving base station through a backbone network in advance.

The method for updating an MGID through a handover procedure will now be described in more detail.

(1) When the connected mode terminal hands over to the target base station, the target base station recognizes that the terminal moves from a base station belonging to an M2M group zone different from the M2M group zone to which the target base station belongs through context information (e.g. M2M group zone ID of the serving base station, etc.) of the terminal. Then, the target base station transmits, to the serving base station through a backbone network, a new MGID of the terminal along with a message for permitting handover of the terminal. Upon reception of the new MGID of the terminal from the target base station, the serving base station transmits the new MGID along with HO-CMD to the terminal. According to this method, the terminal need not additionally perform MGID update after handover, and thus MGID update can be rapidly carried out.

(2) When the connected mode terminal hands over to the target base station, the target base station recognizes that the terminal moves from a base station belonging to an M2M group zone different from the M2M group zone to which the target base station belongs through context information (e.g. M2M group zone ID of the serving base station, etc.) of the terminal. Then, the target base station allocates a new MGID to the terminal when the terminal performs network reentry with the target base station. According to this method, MGID update can be rapidly carried out since the terminal need not additionally perform MGID update after handover. If the M2M group zone ID of the serving base station is not transmitted as the context information of the terminal to the target base station, then the target base station can request the terminal to transmit the M2M group zone ID during the network reentry procedure or immediately after network reentry.

(3) The terminal may recognize that the M2M group zone to which the target base station belongs is different from the M2M group zone to which the serving base station belongs through the messages NBR-ADV and HO-CMD, before handover. Accordingly, the terminal may request MGID update through the message RNG-REQ during network reentry following the handover procedure. Upon reception of the MGID update request, the base station transmits message RNG-RSP including a new MGID to the terminal. Accordingly, the terminal can update the MGID.

(4) When the MGID needs to be updated even if the M2M group zone is not changed, MGID update may be performed through the message RNG-RSP during network reentry.

Figure 4:
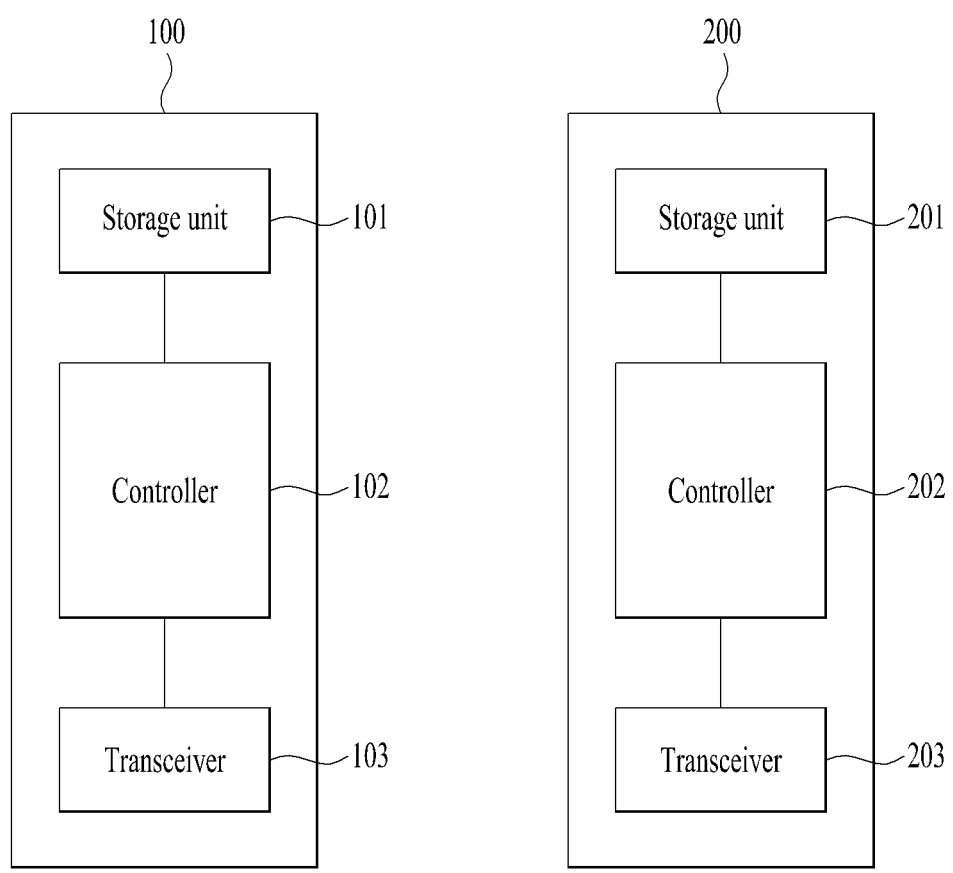
FIG. 4 illustrates block diagrams of an M2M terminal and a base station according to embodiments of the present invention.

FIG. 4 illustrates block diagrams of an M2M terminal and a base station according to embodiments of the present invention.

Referring to FIG. 4, the M2M terminal 100 includes a storage unit 101, a controller 102 and a transceiver 103. The M2M terminal 100 further includes a display unit, a user interface unit, etc.

The controller 102 implements a proposed function, process and/or method. Radio interface protocol layers may be implemented by the controller 102.

The storage unit 101 is connected to the controller 102 to store protocols or parameters for radio communication. That is, the storage unit 101 stores a terminal operating system, applications and general files.

The transceiver 103 is connected to the controller 102 to transmit and/or receive RF signals.

In addition, the display unit displays information about the terminal and may use a well-known element such as a liquid crystal display (LCD), organic light emitting diode (OLED), etc. The user interface unit may be configured as a combination of well-known user interfaces such as a keypad, touch-screen, etc.

The base station 200 includes a controller 202, a storage unit 201 and a transceiver 203.

The controller 202 implements a proposed function, process and/or method. Radio interface protocol layers may be implemented by the controller 202.

The storage unit 201 is connected to the controller 202 to store protocols or parameters for radio communication.

The transceiver 203 is connected to the controller 202 to transmit and/or receive RF signals.

The controllers 102 and 202 may include an application-specific integrated circuit (ASIC), chipset, logic circuit and/or data processor. The memories 101 and 201 may include a read-only memory (ROM), random access memory (RAM), flash memory, memory card, storage medium and/or other storage devices. The transceivers 103 and 203 may include a baseband circuit for processing RF signals. When an embodiment is implemented as software, the above-described methods may be implemented by modules (processes, functions, etc.) performing the above-described functions. The modules may be stored in the storage units 101 and 201 and executed by the controllers 102 and 202.

The storage units 101 and 201 may be located inside or outside the controllers 102 and 202 and connected to the controllers 102 and 202 through various well-known means.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by subsequent amendment after the application is filed. Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for, by a terminal in an idle state in a wireless access system supporting machine-to-machine (M2M) communication, updating an M2M group identifier (MGID) for identifying a multicast service flow shared by a group of M2M terminals in an M2M group zone, the method comprising:
   receiving, from a first base station, the MGID and an M2M group zone identifier of the first base station;
   receiving, from a second base station, an M2M group zone identifier of the second base station;
   requesting MGID update to the second base station when the M2M group zone identifier of the second base station is different from the M2M group zone identifier of the first base station; and
   the second base station updating the MGID on the basis of a new MGID transmitted from the second base station as a response to the request.

2. The method according to claim 1, wherein the step of receiving the M2M group zone identifier of the second base station from the second base station comprises receiving the M2M group zone identifier of the second base station through a broadcast message.

3. The method according to claim 2, wherein the broadcast message is an AAI-SCD (system configuration descriptor) message, a DCL (DL channel descriptor) message, or an NBR-ADV (neighbor advertisement).

4. The method according to claim 1, wherein the requesting of MGID update to the second base station comprises:
   triggering location update; and
   requesting MGID update through location update.

5. The method according to claim 4, wherein the requesting of MGID update through location update comprises transmitting a parameter related to MGID update.

6. The method according to claim 5, wherein the parameter related to MGID update includes the current MGID and current M2M group zone ID.

7. The method according to claim 5, wherein the transmitting of the parameter related to MGID update comprises transmitting the parameter related to MGID update through RNG-REQ (ranging request) message.

8. The method according to claim 4, wherein the new MGID transmitted from the second base station is transmitted through AAI-RNG-RSP (ranging response) message.

9. The method according to claim 1, wherein the requesting of MGID update to the second base station is performed through a network reentry procedure.

10. The method according to claim 1, wherein the receiving of the MGID and the M2M group zone identifier of the first base station from the first base station comprises receiving the MGID and the M2M group zone identifier of the first base station through a dynamic service addition (DSA) procedure.

11. A terminal supporting M2M communication, comprising:
   a transceiver for transmitting/receiving an RF signal to/from an external device; and
   a controller connected to the transceiver,
   wherein the controller controls the transceiver to receive, from a first base station, an MGID and an M2M group zone identifier of the first base station, to receive, from a second base station, an M2M group zone identifier of the second base station and to request MGID update to the second base station when the M2M group zone identifier of the second base station is different from the M2M group zone identifier of the first base station and updates the MGID on the basis of a new MGID transmitted from the second base station as a response to the request.

12. The terminal according to claim 11, wherein the controller controls the transceiver to receive the M2M group zone identifier of the second base station through a broadcast message.

13. The terminal according to claim 12, wherein the broadcast message is an AAI-SCD (system configuration descriptor) message, a DCL (DL channel descriptor) message, or an NBR-ADV (neighbor advertisement).

14. The terminal according to claim 11, wherein the controller triggers location update to request MGID update to the second base station and controls the transceiver to request MGID update through location update.

15. The terminal according to claim 14, wherein the controller controls the transceiver to transmit a parameter related to MGID update to the second base station through location update.

16. The terminal according to claim 15, wherein the parameter related to MGID update includes the current MGID and current M2M group zone ID.

17. The terminal according to claim 15, wherein the controller controls the transceiver to transmit the parameter related to MGID update through RNG-REQ message.

18. The terminal according to claim 14, wherein the new MGID transmitted from the second base station is transmitted through AAI-RNG-RSP message.

19. The terminal according to claim 11, wherein the controller controls the transceiver to request MGID update to the second base station through a network reentry procedure.

20. The terminal according to claim 11, wherein the controller controls the transceiver to receive the MGID and the M2M group zone identifier of the first base station through a DSA procedure.

* * * * *